Feb. 2, 1926.  
H. K. WHITEHORN  
DYNAMO ELECTRIC MACHINE  
Filed August 6, 1924  
1,571,613
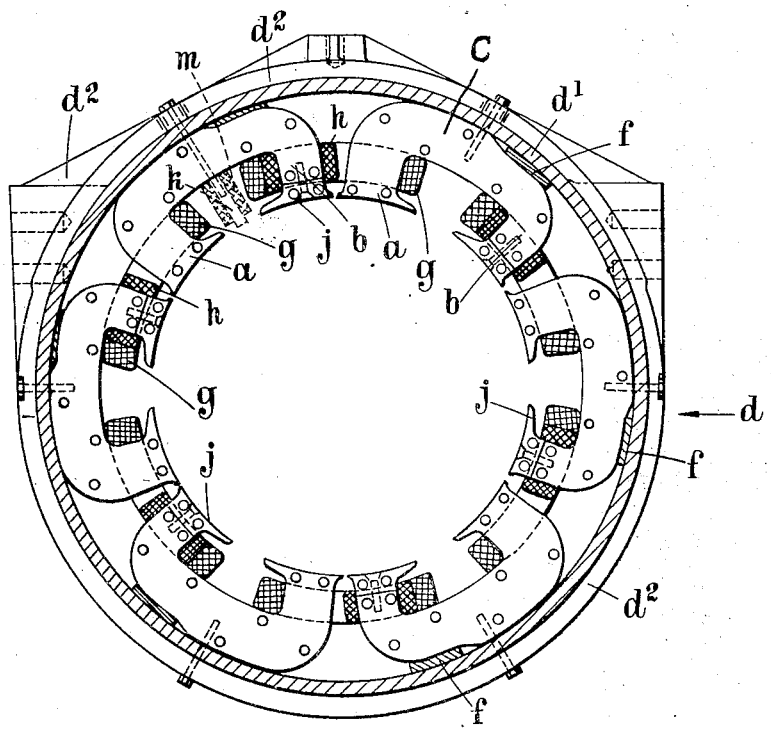
INVENTOR  
H. K. Whitehorn,  
BY  
ATTORNEY Patented Feb. 2, 1926.

1,571,613

UNITED STATES PATENT OFFICE.

HAROLD KENNETH WHITEHORN, OF MAIDSTONE, ENGLAND, ASSIGNOR TO TILLING-STEVENS MOTORS LIMITED, OF MAIDSTONE, ENGLAND.

DYNAMO-ELECTRIC MACHINE.

Application filed August 6, 1924. Serial No. 730,488.

*To all whom it may concern:*

Be it known that HAROLD KENNETH WHITEHORN, a British subject, residing at 120 Tonbridge Road, Maidstone, Kent, England, has invented certain new and useful Improvements in Dynamo-Electric Machines, of which the following is a specification.

This invention relates to dynamo electric machines. An object is to provide a light and efficient construction of uni-directional machine—i. e. a machine in which the relative direction of rotation of field and armature (whether either one or both be designed to rotate) is normally or at maximum load in a predetermined direction as opposed to a machine intended to run indifferently in either direction.

Another object is to counteract the uneven distribution of the magnetism on the pole face due to armature reaction, which, as is well known, tends on load to decrease the flux on the leading pole tip in a generator; the distortion in a motor is in the opposite direction.

It has been proposed to overcome this by the use of various arrangements of series windings disposed, for example, in notches in the pole face.

The present invention is concerned with machines of the kind in which the field magnet poles are divided into magnetically separated (or substantially so) portions, a yoke portion extending between the adjacent portions of adjacent poles; the field magnet thus in effect consists of a number of separate magnets with like poles adjacent to one another, each pair of like poles forming a single field magnet pole.

The present invention comprises in such a machine a field magnet built up as described characterized in that one section of each pole—i. e.—one limb of each of the constituent magnets—is provided with a series winding spanning that limb alone for the purpose of maintaining substantially uniform distribution of the flux on the pole face in spite of armature reaction when the machine comes under load.

The invention further comprises in such a machine a field magnet consisting of magnets having one pole of comparatively large sectional area and one of comparatively small sectional area, one large and one small pole of adjacent magnets (hereinafter for convenience called pole-sections) forming each main pole of the field magnet, the small pole-section being wound with the series winding tending to compensate for armature reaction, by strengthening the field where it would normally be weakened by distortion according to the direction of rotation in either a generator or a motor. preferably the normal winding of the machine (whether shunt, compound, series or separately excited) spans the whole field magnet pole, but this is not esential, as each pole-section may be separately wound, or in certain cases only one pole section need be wound, as hereinafter explained.

A further feature of the invention lies in the arrangement of commutating poles attached to or integral with the yoke between pole-sections. Preferably these are employed in the form in which each magnet includes a large and a small pole-section the commutating pole being of the same polarity as the small pole-section.

The invention further comprises the novel features, combinations and arrangements which are embodied in the preferred forms hereinafter described and are specifically claimed.

Referring to the accompanying drawing, a preferred form of field construction is shown comprising a number of similar laminated magnets mounted in a non-magnetic frame.

As illustrated the complete field magnet is built up of laminated magnets each provided with a pole-section $a$ of comparatively large area and a pole-section $b$ of comparatively small area connected by a yoke portion $c$, the yoke portion being correspondingly reduced in area on the side nearer to the small pole-section. As shown it is definitely stepped adjacent to the interpole, but particularly where no interpoles are used it may rather be of somewhat tapering form. The magnets are assembled in a frame $d$ which forms no essential part of the magnetic circuit and consisting, as shown, of a thin cast aluminium ring $d^1$ formed with appropriate strengthening ribs $d^2$, intermediate packing pieces $f$ which may be of non-magnetic material being provided. A shunt (or series) winding $g$ spans each pole and in addition there is a series winding $h$ on each small pole-section $a$, each of these latter pole-sections being provided with a detachable shoe *j* to facilitate assembly (or the coil being of sufficient size to be slipped over the pole-tips). Commutating poles *k* with suitable windings *m* are possible additions in this construction: one such pole is indicated in the drawing.

It will be noted that the stepped arrangement of the yoke adjacent to the interpole suitably proportions the areas of the yoke and pole-sections leading to the respective pole faces.

The term "series" coil or winding is to be understood throughout to include a coil carrying either the whole or a portion of the main current.

It will be understood that pole tips may be employed of unsymmetrical form in known manner to assist in correct distribution of the pole flux.

I claim:—

1. A dynamo-electric machine having a field magnet including the combination of a plurality of magnets each having one pole of comparatively large and one of comparatively small sectional area, a large pole and a small pole from adjacent magnets forming two separate sections of each main pole of the complete field magnet and a series winding spanning each small pole section.

2. A dynamo-electric machine having a field magnet including the combination of a plurality of magnets magnetically separated from one another, each of said magnets comprising two poles and a connecting yoke portion, the arrangement being such that one pole from each of two adjacent magnets forms a section of each main pole of the complete field magnet and a series winding spanning one pole alone of each of the constituent magnets.

3. A dynamo-electric machine having a field magnet including the combination of a plurality of constituent magnets each comprising three poles, the two outer poles forming sections of adjacent main poles of the machine and the intermediate pole forming an interpole, the proportions being such that the sectional area of one outer pole is substantially equal to the combined sectional areas of the second outer pole and the intermediate pole.

4. A dynamo-electric machine having a field magnet including the combination of a plurality of constituent magnets each comprising a yoke portion and three poles, the two outer poles forming sections of adjacent main poles of the machine and the intermediate pole forming an interpole, the proportions being such that the sectional area of one outer pole is substantially equal to the combined sectional areas of the second outer pole and the intermediate pole and the yoke portion being stepped adjacent to the interpole so as to leave a smaller sectional area of yoke leading to the smaller of the outer poles.

In testimony whereof I affix my signature.

HAROLD KENNETH WHITEHORN.